United States Patent
Uchino

(10) Patent No.: US 7,311,036 B2
(45) Date of Patent: Dec. 25, 2007

(54) PNEUMATIC CYLINDER

(75) Inventor: Makoto Uchino, Tokyo (JP)

(73) Assignee: Koganei Corporation, Tokyo (JP)

(*) Notice: Subject to any disclaimer, the term of this patent is extended or adjusted under 35 U.S.C. 154(b) by 559 days.

(21) Appl. No.: 10/517,292

(22) PCT Filed: May 28, 2003

(86) PCT No.: PCT/JP03/06661

§ 371 (c)(1), (2), (4) Date: Dec. 7, 2004

(87) PCT Pub. No.: WO03/004660

PCT Pub. Date: Dec. 18, 2003

(65) Prior Publication Data
US 2005/0172800 A1    Aug. 11, 2005

(30) Foreign Application Priority Data
Jun. 7, 2002    (JP) ............... 2002-166887

(51) Int. Cl.
F16C 32/06    (2006.01)

(52) U.S. Cl. .................. 92/165 R; 92/DIG. 1; 92/DIG. 2; 384/12

(58) Field of Classification Search ............... 92/1, 92/165 R, 168, 169.1, DIG. 1, DIG. 2; 384/12, 384/100
See application file for complete search history.

(56) References Cited

U.S. PATENT DOCUMENTS 5,218,896 A * 6/1993 Furukawa ............ 92/DIG. 2
6,428,210 B1 * 8/2002 Kafai ...................... 384/12

FOREIGN PATENT DOCUMENTS

| GB | 1 536 118 | 12/1978 |
|----|-----------|---------|
| JP | 62028519 | 2/1987 |
| JP | 5322963 | 12/1993 |
| JP | 6015490 | 1/1994 |
| JP | 8121482 | 5/1996 |
| JP | 2001050210 | 2/2001 |
| JP | 2001271808 | 10/2001 |

* cited by examiner

Primary Examiner—Michael Leslie
(74) Attorney, Agent, or Firm—McCormick, Paulding & Huber LLP

(57) ABSTRACT

A pneumatic cylinder has a shaft member having a piston and a piston rod combined with each other in an axial direction, a cylinder body supporting the shaft member with the piston rod protruding outwardly therefrom so as to freely reciprocate linearly, and porous air bearings and which are incorporated into the cylinder body and slidably support the piston and the piston rod. Materials whose thermal expansion coefficients are approximately equivalent are used for the shaft member, the cylinder body, and the air bearings. While gaps between the shaft member and the air bearings are held constant, and the functions of air layers formed in the gap, namely, a sliding function and a sealing function can be maintained stably regardless of temperature change.

4 Claims, 3 Drawing Sheets

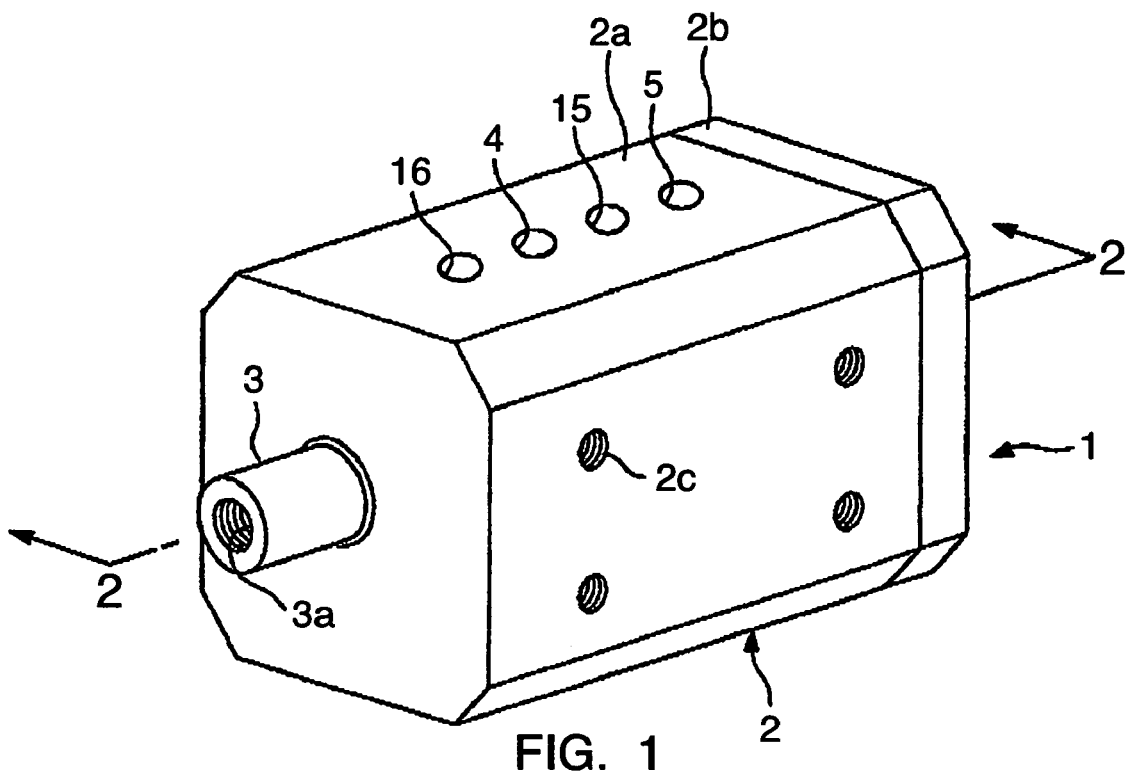
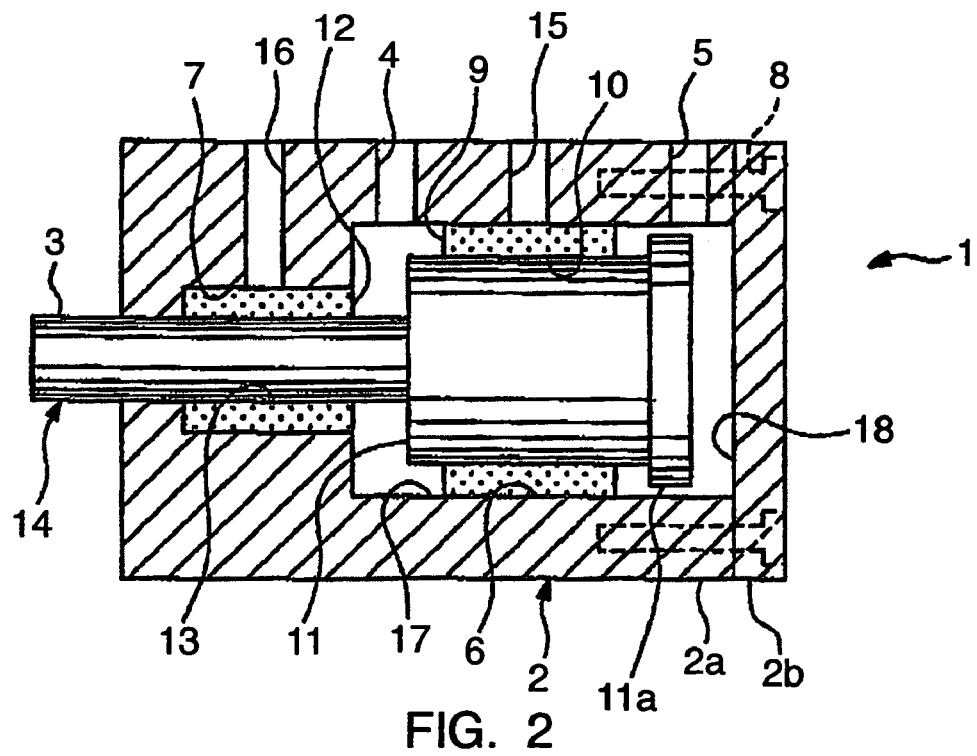

PNEUMATIC CYLINDER

CROSS REFERENCE TO PRIOR APPLICATIONS

The priority of Japanese Patent Application No. 2002-166887 filed on Jun. 7, 2002 and PCT application PCT/JP03/06661 filed on May 28, 2003 is claimed, and the disclosure of the both applications is incorporated by reference.

TECHNICAL FIELD

The present invention relates to a pneumatic cylinder where a rod reciprocates by means of air pressure.

BACKGROUND ART

Pneumatic cylinders have a cylinder body comprised of a cylinder tube, a cylinder block and the like, a piston to be housed in a cylindrical chamber formed in the cylinder body so as to freely reciprocate therein, and a piston rod which protrudes outside of the cylinder body integrally with the piston. The reciprocating motion of the piston caused by supplying and exhausting a working fluid to/from both end surfaces of the piston is transmitted to the outside via the piston rod.

The pneumatic cylinders are divided, according to working forms, into single acting cylinders in which compressed air as the working fluid is supplied only to one of pressure chambers formed on both sides of the piston and movement to the opposite direction is made by means of a spring or an external force, and double acting cylinders in which a piston rod advances and retreats both by means of a compressed air. Further, a pneumatic cylinder in which a piston rod is provided on both sides of the piston is called as a double rod end cylinder, and a pneumatic cylinder in which a piston rod is provided to one side is called as a single rod cylinder.

Apparatuses using the pneumatic cylinder include a conveying apparatus or the like for conveying work pieces from steps to steps of a production line. For example, in the case where electronic parts such as semiconductor chips are inspected, a lot of electronic parts arranged on a tray or the like are mounted onto an inspection board by a conveying apparatus. Further, also in the case where the electronic parts are mounted onto a mounting board, the electronic parts are mounted onto the mounting board in a predetermined order by using the conveying apparatus.

Such a conveying apparatus is provided with a conveying head which is movable to a horizontal direction, and an up-down moving member which is movable to a vertical direction is attached to the conveying head. Further, a sticking tool is attached to a front end of the up-down moving member, the stuck electronic parts are ascended, moved horizontally and descended, so as to be conveyed to a predetermined position. A pneumatic cylinder is used as the up-down moving member. The sticking tool is attached to a front end of the piston rod and compressed air is supplied to the pneumatic cylinder so as to be controlled. As a result, the electronic parts can be ascended and descended.

Such a pneumatic cylinder requires a sealing performance which holds air pressure difference between the front and back of the axial direction at a sliding portion between the piston and piston rod, and a cylinder body. For this reason, a packing using an elastic material such as rubber or resin is fitted to an outer periphery of the piston and the piston rod, so that the outer periphery of the piston and piston rod are made to slide and contact with an inner peripheral surface of the cylinder body. In the case where the pneumatic cylinder is continuously used, however, a temperature rises so that the packing is easily damaged, and a sliding load at the time of the sliding of the piston is centered on the outer periphery of the packing so that sliding resistance becomes higher. Thus, there arises a problem that an operating cost in the case where the pneumatic cylinder is used in the conveying apparatus or the like increases.

For this reason, in recent years, instead of the packing, a slide bearing using a porous material is incorporated into the sliding portion of the cylinder body, and compressed air is always supplied from its outer periphery to the inner portion so as to form an air layer on the sliding portion (a gap between the piston or the piston rod and the slide bearing), so that the sliding resistance is reduced and the sealing performance is improved. Such an air bearing is developed.

A performance of the air layer formed by the air bearing is, however, remarkably influenced by a size of the gap of the sliding portion, and when a temperature is changed by continuous use or the like, the gap of the sliding portion easily increases or decreases greatly. For this reason, also the sliding performance and the sealing performance of the air bearing might increase or decrease greatly.

It is an object of the present invention to provide a pneumatic cylinder which is capable of maintaining the stable sliding performance and sealing performance regardless of the temperature change even if the air bearing is used.

SUMMARY OF THE INVENTION

A pneumatic cylinder of the present invention is characterized by including: a shaft member having a piston and a piston rod connected to each other in an axial direction; a cylinder body for supporting the shaft member so as to freely reciprocate linearly while the piston rod is protruding to the outside thereof; and porous air bearings which are incorporated into the cylinder body and slidably support the shaft member, wherein materials having the approximately equivalent thermal expansion coefficient are used for the shaft member, the cylinder body and the air bearings respectively, and gaps between the shaft member and the air bearings are held constant regardless of temperature change.

As a result, the gaps between the shaft member and the air bearings are held constant regardless of temperature change, and performances of air layers formed therebetween, namely, a sliding performance and a sealing performance can be held constant regardless of temperature change. For this reason, the pneumatic cylinder can be widely used in a very wide temperature range including from low temperature to high temperature.

The pneumatic cylinder of the present invention is characterized in that titanium is used as the materials of the shaft member and the cylinder body, and carbon is used as the material of the air bearings.

As a result, the pneumatic cylinder can be achieved such that the shaft member and the cylinder body provide a specific strength (rigidity/mass) and the air bearings have a good sliding performance.

The pneumatic cylinder of the present invention is characterized in that titanium is used as the materials of the shaft member and the cylinder body, and ceramic is used as the material of the air bearings.

As a result, the pneumatic cylinder can be achieved such that the shaft member and the cylinder body provide a specific strength (rigidity/mass) and the air bearings have high durability.

The pneumatic cylinder of the present invention is characterized in that copper or copper alloy is used as the materials of the shaft member and the cylinder body, and a sintered material of copper or copper alloy is used as the material of the air bearings.

As a result, the pneumatic cylinder can be achieved such that the shaft member, the cylinder body, and the air bearings have a good sliding performance.

BRIEF DESCRIPTION OF THE DRAWINGS

FIG. 1 is a perspective view illustrating a pneumatic cylinder according to a first embodiment of the present invention;

FIG. 2 is a sectional view taken along line A-A of FIG. 1;

BEST MODE FOR CARRYING OUT THE INVENTION

Figure 3:
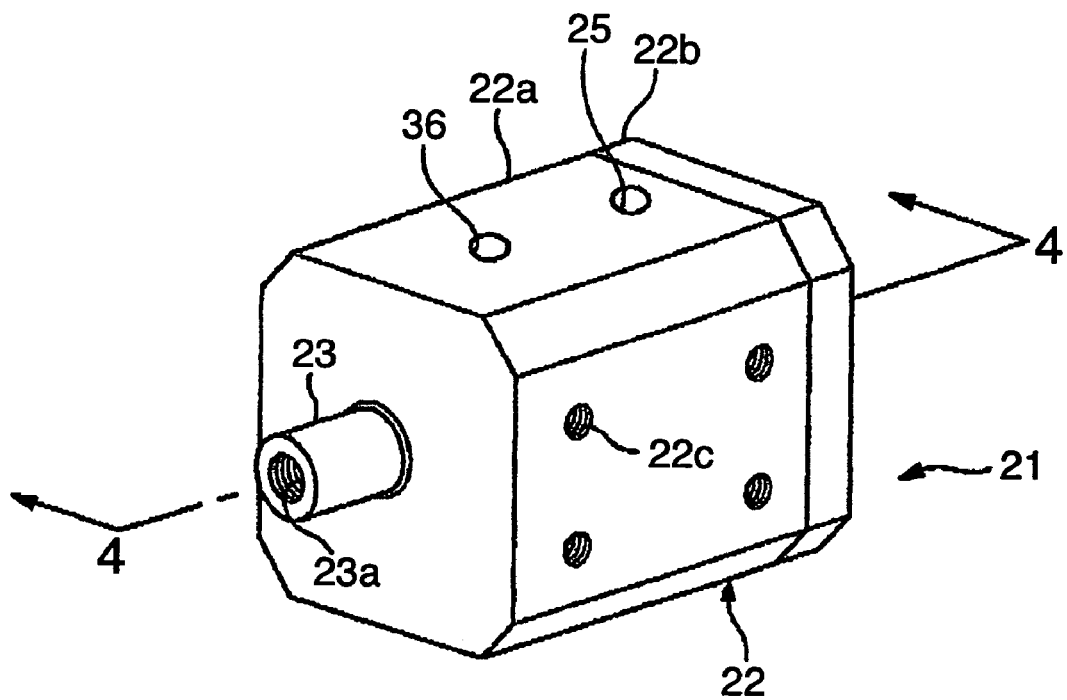
FIG. 3 is a perspective view illustrating the pneumatic cylinder according to a second embodiment of the present invention.

Embodiments of the present invention are explained in detail below with reference to the drawings.

FIG. 1 is a perspective view illustrating a pneumatic cylinder 1 according to a first embodiment of the present invention. As shown in FIG. 1, a cylinder body 2 having an approximately rectangular shape is comprised of a piston block 2a and a head cover 2b, and a piston rod 3 which protrudes outwardly is slidably attached into the cylinder body 2. Compressed air is supplied to two supply and exhaust ports 4 and 5 formed on an upper end surface of the cylinder body 2 in the drawing so as to be controlled, so that the piston rod 3 reciprocates. With such a construction, the pneumatic cylinder 1 is a double acting cylinder.

FIG. 2 is a sectional view taken along line A-A of FIG. 1. As shown in FIG. 2, a piston housing hole 6 and a rod housing hole 7 are formed in the piston block 2a to a longitudinal direction. A head cover 2b is attached in a sealed manner to an opened end of the piston housing hole 6 in the piston block 2a and is fastened by a screw member 8 so that the cylinder body 2 is formed.

An air bearing 9 made of a porous material is attached to the piston housing hole 6, and a piston 11 is slidably housed in a piston sliding hole 10 formed inwardly to the air bearing 9. Similarly, an air bearing 12 made of a porous material is attached to the rod housing hole 7 provided at the side of one end of the piston 11, and the piston rod 3 having a female thread section 3a is slidably attached to a rod sliding hole 13 formed on an inner portion of the air bearing 12. The piston rod 3 and the piston 11 form a shaft member 14.

A flange 11a is formed on one end of the piston 11, and the piston rod 3 is coaxially fixed to the other end thereof so that they are integral with each other to form the shaft member 14 which is supported by the cylinder body 2 slidably to the axial direction thereof. Further, since the shaft member 14 is fixed, relative rotation of the piston rod 3 with respect to the piston 11, namely, the rotation of the piston rod 3 in the state that the piston 11 is stopped is restrained. The piston 11 and the piston rod 3 may be fixed by using a fastening member as a fixing unit, may be formed integrally, or may be fixed by fitting or adhesion.

As shown in FIG. 2, bearing ports 15 and 16 which are connected to the housing holes 6 and 7 are respectively formed on an upper end surface of the cylinder body 2 in the drawing so that compressed air can be supplied to the air bearings 9 and 12.

Further, a backward air pressure chamber 17 is formed in the cylinder body 2 on one end of the piston 11 (connected side with the piston rod 3), and a forward air pressure chamber 18 is formed in the cylinder body 2 on the other end of the piston 11. The backward air pressure chamber 17 and the forward air pressure chamber 18 are connected to supply and exhaust ports 4 and 5 formed on the upper end of the cylinder body 2, and a compressed air supply apparatus, not shown, is connected to the supply and exhaust ports 4 and 5.

When the compressed air supply apparatus is actuated so that compressed air is introduced from the supply and exhaust port 4 and is exhausted from supply and exhaust port 5, the piston 11 is pressed by the compressed air in the backward air pressure chamber 17 and slides to the backward direction so that the piston rod 3 is housed in a backward limit position in the cylinder body 2. On the other hand, when the compressed air is introduced from the supply and exhaust port 5 and is exhausted from the supply and exhaust port 4, the piston 11 is pressed by the compressed air in the forward air pressure chamber 18 and slides to the forward direction, so that the piston rod 3 is protruded up to a forward limit position outside the cylinder body 2. FIG. 2 illustrates a state that the piston 11 is moved to the backward limit position, and the piston rod 3 is housed in the backward limit position in the cylinder body 2.

Further, the compressed air supply apparatus is also connected to the bearing ports 15 and 16, and when the compressed air is supplied, an air layer is formed between the air bearing 9 and the piston 11, and similarly an air layer is formed between the air bearing 12 and the piston rod 3 so that sliding resistance can be decreased and the sealing performance can be improved. The compressed air is exhausted from the exhausting sides of the supply and exhaust ports 4 and 5. Further, supplying leaked air to the air bearings 9 and 12 may be adopted to prevent generation of dust.

The shaft member 14 having the piston 11 and the piston rod 3 and the cylinder body 2 having the piston block 2a and the head cover 2b are formed by titanium, and the air bearings 9 and 12 for slidably supporting the piston 11 and the piston rod 3 are formed by carbon whose thermal expansion coefficient is approximately equivalent to that of titanium. That is, the entire pneumatic cylinder 1 has approximately uniform thermal expansion coefficient over the respective sections.

For this reason, even in the case where the pneumatic cylinder 1 is continuously used and the entire temperature rises, the respective components thermally expand such that their dimensions are enlarged with the approximately same ratio. That is, the gaps between the respective components only similarly change with the same ratio, and thus they do not remarkably increase or decrease.

Also gaps between the piston 11 and the piston rod 3, and the air bearings 9 and 12 for slidably supporting them become stable regardless of temperature change, and the performances of the air layers formed in the gaps, namely, a sliding performance and a sealing performance can be stable regardless of temperature change.

FIG. 3 is a perspective view illustrating a pneumatic cylinder 21 according to a second embodiment of the present invention. As shown in FIG. 3, a cylinder body 22 having an approximately rectangular shape is comprised of a piston block 22a and a head cover 22b, and the cylinder body 22 contains therein the piston rod 23 slidably mounted while protruding outward and a spring member. Compressed air is controlled to be supplied into a supply and exhaust port 25 formed on the upper end of the cylinder body 22 in the drawing, so that the piston rod 23 is cooperative with an internal spring member 24 to achieve reciprocating motion. Thus, the pneumatic cylinder 21 is a type of single acting cylinder.

Figure 4:
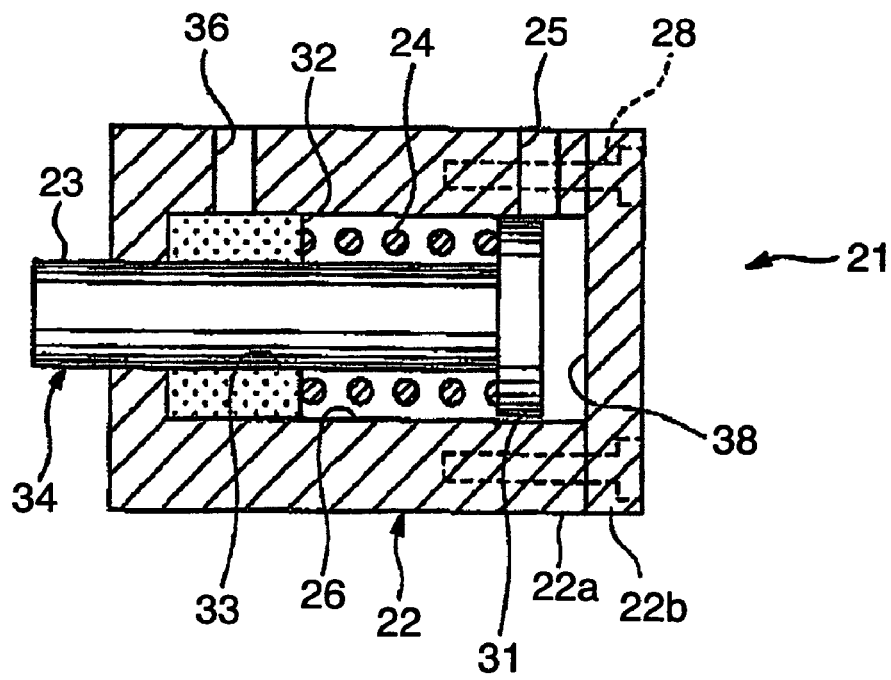
FIG. 4 is a sectional view taken along line B-B of FIG. 3.

FIG. 4 is a sectional view taken along line B-B of FIG. 3. As shown in FIG. 4, a piston housing hole 26 is formed in a longitudinal direction of the piston block 22a. The head cover 22b is attached in a sealing manner to the opened end of the piston housing hole 26 of the piston block 22a and is fastened by a screw member 28, so that the cylinder body 22 is formed.

The piston housing hole 26 houses a piston 31 therein. An air bearing 32 made of a porous material is attached to the side opposite to the opening end of the piston housing hole 26, and a rod sliding hole 33 formed inwardly to the air bearing 32 slidably houses the piston rod 23 which has a female thread section 23a on the end thereof. The piston rod 23 is fixed to one end of the piston 31 so as to slide integrally as a shaft member 34. The piston 31 and the piston rod 23 forming the shaft member 34 may be fixed by using the fastening member as the fixing unit, may be formed integrally, or may be fixed by fitting or adhesion. Further, the spring member 24 is attached to a coaxial outer periphery of the piston rod 23 between the piston 31 and the air bearing 32.

As shown in FIG. 4, a bearing port 36 which is connected to the piston housing hole 26 is formed on the upper end surface of the cylinder body 22 in the drawing so that compressed air can be supplied to the air bearing 32. Further, a forward air pressure chamber 38 is formed on the head cover 22b of the piston 31. The forward air pressure chamber 38 is communicated with the supply and exhaust port 25 formed on the upper end surface of the cylinder body 22 in the drawing, and the compressed air supply apparatus, not shown, is connected to the supply and exhaust port 25.

When the compressed air supply apparatus is actuated and compressed air is introduced from the supply and exhaust port 25, the compressed air in the forward air pressure chamber 38 overpowers the pressing power of the spring member 24 so as to slide the piston 31 to the forward direction and protrude the piston rod 23 to the forward limit position outside the cylinder body 22. On the other hand, when the compressed air is exhausted from the supply and exhaust port 25, the piston 31 is pressed by the spring member 24 so as to slide to the backward direction, and the piston rod 23 is housed in the backward limit position in the cylinder body 22. FIG. 4 illustrates the state that the piston 31 moves to the backward limit position and the piston rod 23 is housed in the backward limit position in the cylinder body 22.

Further, the compressed air supply apparatus is also connected to the bearing port 36, and when the compressed air is supplied thereto, the air layer is formed between the air bearing 32 and the piston rod 23 so that the sliding resistance can be reduced. The compressed air is exhausted form the supply and exhaust port 25 to be used when exhausting. Further, supplying leaked air to the air bearing 32 may be adopted to prevent generation of dust.

The shaft member 34 having the piston 31 and the piston rod 23 and the cylinder body 22 having the piston block 22a and the head cover 22b are formed by titanium, and the air bearing 32 for slidably supporting the piston rod 23 is formed by carbon whose thermal expansion coefficient is approximately equivalent to that of titan. That is, the entire pneumatic cylinder 21 has the uniform thermal expansion coefficient over the respective sections.

For this reason, even in the case where the pneumatic cylinder 21 is continuously used and the entire temperature rises, the respective components thermally expand such that their dimensions become large with the same ratio. That is, the gaps between the components only similarly change with the same ratio and thus do not remarkably increase or decrease.

Also the gap between the piston rod 23 and the air bearing 32 for slidably supporting it, therefore, becomes stable regardless of temperature change, and the performances of the air layers formed on the gap, namely, the sliding performance and the sealing performance can be stable regardless of temperature change.

Figure 5:
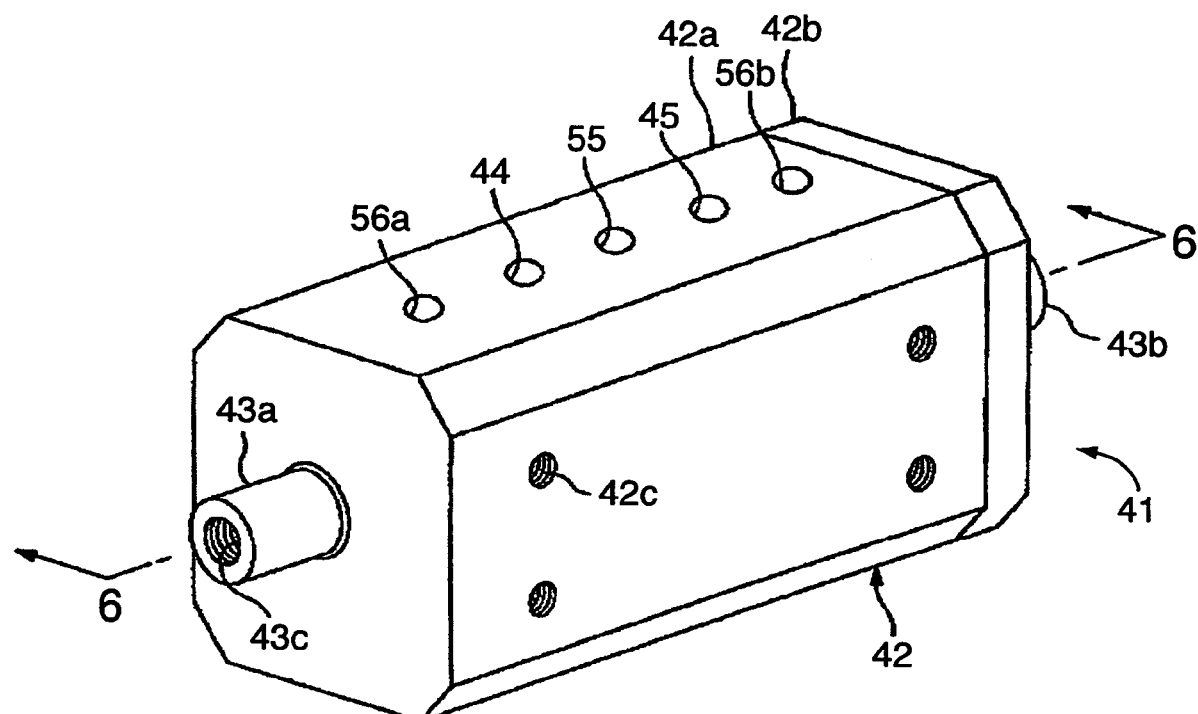
FIG. 5 is a perspective view illustrating the pneumatic cylinder according to a third embodiment of the present invention.

FIG. 5 is a perspective view illustrating the pneumatic cylinder 41 according to a third embodiment of the present invention. As shown in FIG. 5, a cylinder body 42 having an approximately rectangular shape is comprised of a piston block 42a and a head cover 42b, and two piston rods 43a and 43b which protrude outward from both sides in the axial direction are slidably mounted into the cylinder body 42, and compressed air is controlled to be supplied into the two supply and exhaust ports 44 and 45 formed on the upper end surface of the cylinder body 42 in the drawing, so that the piston rods 43a and 43b reciprocate to the same direction. Thus, the pneumatic cylinder 41 is a type of double rod acting.

Figure 6:
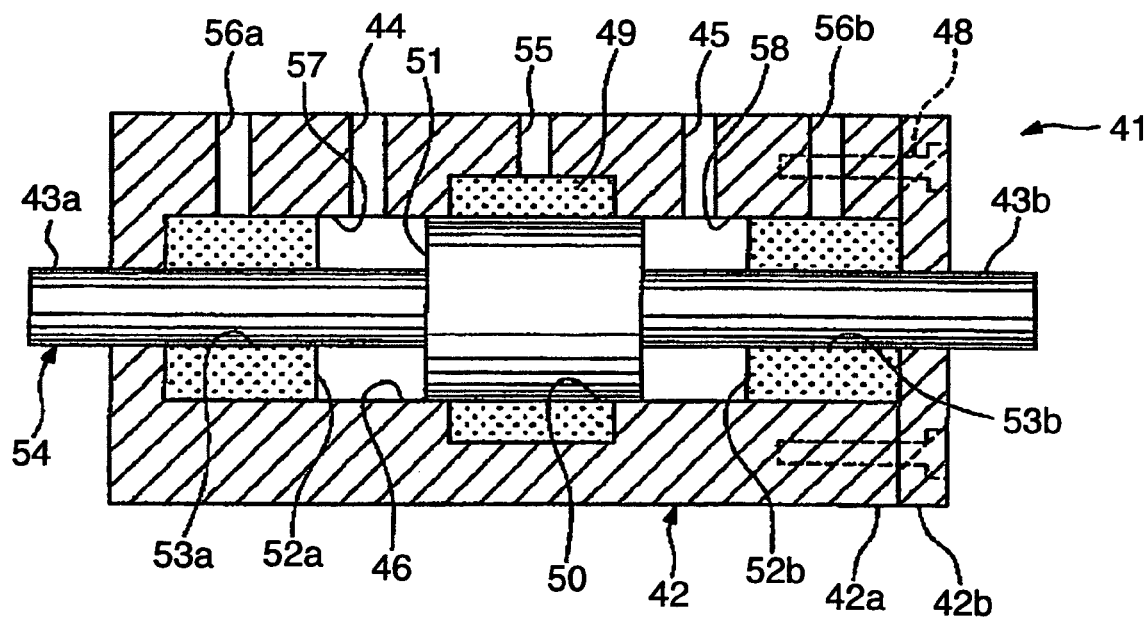
FIG. 6 is a sectional view taken along line C-C of FIG. 5.

FIG. 6 is a sectional view taken along line C-C of FIG. 5. As shown in FIG. 6, a piston housing hole 46 is formed in the piston block 42a to the longitudinal direction. The head cover 42b is attached in the sealing manner to the opened end of the piston housing hole 46 in the piston block 42a and is fastened by a screw member 48, so that the cylinder body 42 is formed.

An air bearing 49 made of a porous material is attached to a center position of the piston housing hole 46 in the longitudinal direction, and a piston 51 is slidably housed in a piston sliding hole 50 formed inwardly to the air bearing 49. Similarly, air bearings 52a and 52b made of a porous material are attached to the unopened end and the opened end of the piston housing hole 46, respectively, and the piston rods 43a and 43b having a female thread sections 43c on the end are slidably attached to rod sliding holes 53a and 53b formed inwardly to the air bearings 52a and 52b, respectively. The two piston rods 43a and 43b and the piston 51 form a shaft member 54.

The piston rods 43a and 43b are fixed to both end surfaces of the piston 51 coaxially and are integral with each other as the shaft member 54 so as to be slidably supported by the cylinder body 42 to the axial direction. Further, since the shaft member 54 is fixed, the relative rotation of the piston rods 43a and 43b with respect to the piston 51, namely, the rotation of the piston rods 43a and 43b in the estate that the piston 51 is stopped is suppressed. The piston 51 and the piston rods 43a and 43b may be fixed by using the fastening member as the fixing unit, may be formed integrally, or may be fixed by fitting or adhesion.

As shown in FIG. 6, the bearing ports 55, 56a and 56b which are communicated with the piston housing hole 46 are formed on the upper end surface of the cylinder body 42 in the drawing so that compressed air can be supplied to the air bearings 49, 52a and 52b.

Further, a first air pressure chamber 57 is formed in the cylinder body 42 at the side of one end of the piston 51, and a second air pressure chamber 58 is formed in the cylinder body 42 at the side of the other end of the piston 51. The supply and exhaust ports 44 and 45 formed on the upper end surface of the cylinder body 42 are communicated with the first air pressure chamber 57 and the second air pressure chamber 58, respectively, and the compressed air supply apparatus, not shown, is connected to the supply and exhaust ports 44 and 45.

When the compressed air supply apparatus is actuated so as to introduce the compressed air from the supply and exhaust port 44 and exhausts the compressed air from the supply and exhaust port 45, the piston 51 is pressed by the compressed air in the first air pressure chamber 57 so as to slide to the backward direction of the piston rod 43a (to the right direction in the drawing). The piston rod 43a is housed in the backward position in the cylinder body 42 (right-side limit position in the drawing), and the piston rod 43b is protruded outside of the cylinder body 42. On the other hand, when the compressed air is introduced from the supply and exhaust port 45 and is exhausted from the supply and exhaust port 44, the piston 51 is pressed by the compressed air in the second air pressure chamber 58 so as to slide to the forward direction of the piston rod 43a (to the left direction in the drawing). The piston rod 43a is protruded to the forward limit direction outside of the cylinder body 42 (left-side limit position in the drawing), and the piston rod 43b is housed in the cylinder body 42. FIG. 6 illustrates the state that the piston 51 moves to a neutral position and the piston rods 43a and 43b protrude outward both in equal measure.

Further, the compressed air supply apparatus is also connected to the bearing ports 55, 56a and 56b, and when the compressed air is supplied, the air layer is formed between the air bearing 49 and the piston 51. Similarly, the air layer is formed between the air bearings 52a and 52b and the piston rods 43a and 43b so that the sliding resistance is reduced, and the sealing performance can be improved. The compressed air is exhausted from the exhausting sides of the supply and exhaust ports 44 and 45. Further, supplying leaked air to the air bearings 52a and 52b may be adopted to prevent generation of dust.

The shaft member 54 having the piston 51 and the two piston rods 43a and 43b, and the cylinder body 42 having the piston block 42a and the head cover 442b are formed by titanium. The three air bearings 49, 52a and 52b for slidably supporting the piston 51 and the piston rods 43a and 43b are formed by carbon whose thermal expansion coefficient is equivalent to that of the titanium. That is, the entire pneumatic cylinder 41 has approximately uniform thermal expansion coefficient over the respective sections.

For this reason, even in the case where the pneumatic cylinder 41 is continuously used and the entire temperature rises, the components thermally expand and their dimensions become large with the same ratio, that is, the gaps between the components only similarly change with the same ratio and do not remarkably increase or decrease.

Accordingly, the gaps between the piston 51, the piston rods 43a and 43b and the air bearings 49, 52a and 52b for slidably supporting them, therefore, become stable regardless of temperature change, and the performances of the air layer formed in the gaps, namely, the sliding performance and the sealing performance can be stable regardless of temperature change.

In the case where the pneumatic cylinders 1, 21 and 41 are used for the conveying apparatus for sticking electronic parts such as semiconductor chips and loading them from a parts housing section onto a mounting board or a test board, a sticking tool, not shown, for sticking the electronic parts is attached to internal thread sections 3a, 23a and 43c formed on the ends of the piston rods 3, 23 and 43a.

The pneumatic cylinders 1, 21 and 41 are mounted to the conveying apparatus, not shown, so that the piston rods 3, 23 and 43a face upward and downward directions. At this time, tapped holes 2c, 22c and 42c formed on side end surfaces of the cylinder main bodies 2, 22 and 42 are used so as to be capable of directly attaching the pneumatic cylinders 1, 21 and 41 to the conveying apparatus.

The pneumatic cylinders 1, 21 and 41 mounted to the conveying apparatus in such a manner descend the piston rods 3, 23 and 43a in the parts housing section so as to stick the electronic parts. After the piston rods 3, 23 and 43a are ascended, the pneumatic cylinders 1, 21 and 41 are moved horizontally by the conveying apparatus to the mounting board. In the state that the electronic parts are conveyed to a predetermined position on the mounting board, the piston rods 3, 23 and 43a are descended so that the electronic parts are mounted onto the mounting board.

When the pneumatic cylinders 1, 21 and 41 are continuously operated, even in the case where the entire temperature rises, the components of the pneumatic cylinders 1, 21 and 41 thermal expand with the same ratio. The gaps between the pistons 11, 31 and 51, the piston rods 3, 23, 43a and 43b, and the air bearings 9, 12, 32, 49, 52a and 52b can be stable. While the sliding performance and the sealing performance are maintained stably, therefore, the secure mounting work for the electronic parts can be continued.

The present invention is not limited to the above embodiments, and can be variously changed without departing from the gist. For example, all the materials of the shaft members 14, 34 and 54, the cylinder main bodies 2, 22 and 42, and the air bearings 9, 12, 32, 49, 52a and 52b may be determined uniformly as ceramic, metal or resin.

Further, the porous material used for the air bearings 9, 12, 32, 49, 52a and 52b may have the thermal expansion coefficient approximately equivalent to that of the shaft members 14, 34 and 54 and the cylinder main bodies 2, 22, and 42. A sintered composite material or the like which is obtained by adding metal or ceramic particles or fiber to, sintered metal, sintered resin, sintered carbon and basic metal phase, and sintering to solidify them can be used.

As another example of the combination of the materials, the combination of titanium used for the shaft member and the cylinder body and ceramic used for the air bearing, the combination of copper or copper alloy used for the shaft member and the cylinder body and a sintered material of copper or copper alloy used for the bearing, and the like are effective.

INDUSTRIAL APPLICABILITY

The pneumatic cylinder of the present invention is effective for application in a method where the entire temperature easily rises due to continuous operations such as an operation for conveying electronic parts from step to step of a production line and an operation for mounting the electronic parts onto the mounting board in a predetermined order. The pneumatic cylinder can be used an acuatorin apparatus for conveying the electronic parts such as semiconductor chips.

The invention claimed is:

1. A pneumatic cylinder, comprising:
   a shaft member having a piston and a piston rod connected to each other in an axial direction;
   a cylinder body supporting the shaft member so as to freely reciprocate linearly while the piston rod is protruding to the outside thereof; and
   porous air bearings which are incorporated into the cylinder body and slidably support the shaft member,
   wherein materials having the approximately equivalent thermal expansion coefficient are used for the shaft member, the cylinder body and the air bearings respectively, and gaps between the shaft member and the air bearings are held constant regardless of temperature change.

2. The pneumatic cylinder according to claim 1, wherein titanium is used as the material of the shaft member and the cylinder body, and carbon is used as the material of the air bearings.

3. The pneumatic cylinder according to claim 1, wherein titanium is used as the material of the shaft member and the cylinder body, and ceramic is used as the material of the air bearings.

4. The pneumatic cylinder according to claim 1, wherein copper or copper alloy is used as the material of the shaft member and the cylinder body, and a sintered material of copper or copper alloy is used as the material of the air bearings.

* * * * *